US007546760B2

(12) United States Patent
Konrad et al.

(10) Patent No.: US 7,546,760 B2
(45) Date of Patent: Jun. 16, 2009

(54) DEVICE FOR PRESSURE-BASED LOAD DETECTION

(75) Inventors: Heiko Konrad, Baierbrunn (DE); Maximilian Engl, Friedberg-Bachern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/056,739

(22) Filed: Mar. 27, 2008

(65) Prior Publication Data

US 2008/0229816 A1 Sep. 25, 2008

Related U.S. Application Data

(63) Continuation of application No. PCT/EP2006/009229, filed on Sep. 22, 2006.

(30) Foreign Application Priority Data

Sep. 29, 2005 (DE) ....................... 10 2005 046 504

(51) Int. Cl.
*G01M 15/00* (2006.01)

(52) U.S. Cl. ................................. 73/114.33; 73/114.37

(58) Field of Classification Search .............. 73/114.32, 73/114.33, 114.35, 114.37
See application file for complete search history.

(56) References Cited

U.S. PATENT DOCUMENTS 5,069,184 A 12/1991 Kato et al.
5,889,205 A 3/1999 Treinies et al.
5,974,870 A 11/1999 Treinies et al.
6,714,855 B2 3/2004 Pfitz et al.
6,985,806 B2 1/2006 Stadler
7,085,643 B2 * 8/2006 Muto et al. ................. 701/103
7,174,713 B2 2/2007 Nitzke et al
7,318,342 B2 1/2008 Boehm et al.

(Continued)

FOREIGN PATENT DOCUMENTS

DE 39 19 448 A1 12/1989

(Continued)

OTHER PUBLICATIONS

Konrad H. Kramer G, Die Entwicklung der Steuerfunktionen fuer die BMW Valvetronic Motoren. VDI-Berichte, Nr. 1672, AUTOREG 2002, Mannheim, S. 245-256; Kapitel 3.1 und 3.2.

(Continued)

*Primary Examiner*—Eric S McCall
(74) *Attorney, Agent, or Firm*—Crowell & Moring LLP

(57) ABSTRACT

A device for intake manifold pressure-based determination of the air mass flowing into the cylinder combustion chamber is provided. A logic unit determines the inflowing air mass based on the intake manifold pressure using a calculation model for load detection that determines the intake manifold pressure in an upper partial range of the intake manifold pressure. A sensor device for direct detection of the intake manifold pressure measures the intake manifold pressure only in a lower partial range of the intake manifold pressure in the internal combustion engine. The logic unit determines the inflowing air mass as a function of the intake manifold pressure measured by the sensor deice when within the lower partial range of the intake manifold pressure, and based on the intake manifold pressure determined by use of the calculation model when within the upper partial range.

5 Claims, 4 Drawing Sheets

U.S. PATENT DOCUMENTS

| | | | | |
|---|---|---|---|---|
| 2006/0037596 | A1 * | 2/2006 | Fuwa | 123/681 |
| 2006/0116808 | A1 * | 6/2006 | Tanaka | 701/102 |

FOREIGN PATENT DOCUMENTS

| | | | |
|---|---|---|---|
| DE | 100 49 907 | A1 | 4/2002 |
| DE | 102 27 466 | A1 | 1/2004 |
| DE | 10 2004 041 708 | A1 | 3/2006 |
| EP | 0 820 559 | B1 | 1/1998 |
| EP | 1 362 173 | B1 | 11/2003 |
| EP | 1 593 829 | A1 | 11/2005 |
| GB | 2 386 702 | A | 9/2003 |
| WO | WO 97/35106 | A2 | 9/1997 |
| WO | WO 03/046356 | A2 | 6/2003 |

OTHER PUBLICATIONS

German Search Report dated Jan. 9, 2006 with an English translation of the pertinent portions (Nine (9) pages).
International Search Report dated Dec. 15, 2006 with an English translation of the pertinent portions (Four (4) pages).

* cited by examiner

DEVICE FOR PRESSURE-BASED LOAD DETECTION

CROSS REFERENCE TO RELATED APPLICATIONS

This application is a continuation of PCT International Application No. PCT/EP2006/009229, filed Sep. 22, 2006, which claims priority under 35U.S.C. § 119 to German Patent Application No. 10 2005 046 504.8, filed Sep. 29, 2005, the entire disclosures of which are herein expressly incorporated by reference.

BACKGROUND AND SUMMARY OF THE INVENTION

The invention relates to a device for pressure-based load detection, such as a device for determining the air mass flowing into the cylinder combustion chamber of an internal combustion engine cylinder in a motor vehicle.

Load detection involves the determination of the air mass, which for the purpose of combustion is drawn into the combustion chamber of a cylinder of an internal combustion engine.

There are two types of methods of load detection: (1) methods based on direct measurement of the air mass by a sensor system (for example, hot film air flow sensors, hot wire air flow sensors, or the like); and (2) methods which operate without direct air flow measurement. Methods having direct air flow measurement measure the air mass flowing into the intake manifold and calculate the air mass flowing from the intake manifold into the cylinder using a calculation model which describes the intake manifold dynamics. Methods without direct air flow measurement usually use the measured intake manifold pressure, from which a conclusion is drawn concerning the inflowing air mass by use of an air flow model. These methods are also referred to as pressure-based or intake manifold pressure-based methods for load detection. In intake manifold pressure-based methods for load detection, the air mass is determined as a function of the intake manifold pressure and the temperature of the air in the intake manifold. To allow conclusions to be drawn concerning the air flowing into the combustion chamber on the basis of the intake manifold pressure, complex calculation models are necessary which describe the fresh air mass flow from the collector in the intake duct into the combustion chamber of the cylinders. Parameters to be taken into account include the engine speed, the camshaft position, and the control times and/or stroke positions of exhaust and intake valves, the engine temperature, and for supercharged engines, the position of the bypass (wastegate). The fresh air mass remaining in the cylinders constantly increases with increasing intake manifold pressure for otherwise equal input variables (parameters) (see, for example, FIG. 2).

Known devices for pressure-based determination of the air mass (load) include intake manifold pressure sensors which are able to cover, i.e., measure, the entire intake manifold pressure range.

One aspect of the present invention provides a device which ensures improved accuracy in load detection, particularly in low-load regions.

The invention is based on the finding that as the result of the tolerance limits of the sensors, measurement errors occur that have various effects in the different load regions. A distinction is made between an absolute measurement error, whose proportion (magnitude) is constant over the entire measurement range and which corresponds to a percentage of the end value, and a relative measurement error, whose proportion varies as a function of the magnitude of the measured value. The relative measurement error increases disproportionately at low intake manifold pressures (loads), and in this specific case has a particularly disadvantageous effect on the accuracy of the load signal. However, it is precisely at low loads that high accuracy of the load signal is extremely important for drivability of a motor vehicle (for example, in the transition from high loads to idle). The larger the measurement range of a sensor and the higher the gradient of the load as a result of the intake manifold pressure, the more pronounced is the described disadvantageous effect. For these reasons, load calculation models for direct-injection supercharged engines are sensitive to pressure sensor tolerances that are present. For these engines, due to high valve overlap (i.e., phases in which the intake as well as the exhaust valves are open) and the intake manifold pressure range to be detected or measured, the gradient is twice as high as for non-supercharged engines. Thus, the device according to the invention is particularly suited for direct-injection supercharged internal combustion engines.

Exemplary embodiments of the present invention provide a device for determining the air mass flowing into the cylinder combustion chamber of an internal combustion engine cylinder in a motor vehicle, where the inflowing air mass may be determined by use of a calculation model for load detection as a function of the intake manifold pressure. A sensor device is provided for direct detection of the intake manifold pressure, having a measurement range so that by use of the sensor device the intake manifold pressure may be measured only in a lower partial range of the intake manifold pressure in the internal combustion engine. A calculation model is provided for indirect detection of the intake manifold pressure which is designed so as to be capable of determining by calculation the intake manifold pressure in an upper partial range of the intake manifold pressure in the internal combustion engine. The device is designed in such a way that within the lower partial range of the intake manifold pressure the inflowing air mass is determined as a function of the intake manifold pressure measured by the sensor device, and that within the upper partial range of the intake manifold pressure the inflowing air mass is determined on the basis of the intake manifold pressure determined using the calculation model.

One device according to the invention comprises a sensor device (intake manifold pressure sensor) whose measurement range covers only the lower portion of the physical intake manifold pressure range for the internal combustion engine. On account of the smaller measurement range, the absolute measurement error is less than for a measuring device which covers the entire physical measurement range (total physical intake manifold pressure range). In addition, because of the smaller relative measurement error, the error in determining the load as a function of the measured intake manifold pressure is much less at lower loads. Outside the pressure range of the pressure sensor used, the intake manifold pressure is determined by use of a calculation model, and the required load is computed based on the calculated intake manifold pressure. The error present due to the calculation model for calculating the intake manifold pressure in the upper range of the intake manifold pressure is much less noticeable, so that the advantages of increased accuracy clearly predominate in the lower range of the intake manifold pressure.

In one exemplary embodiment, the intake manifold pressure (value) measured in the lower portion of the intake manifold pressure range is directly used as an input variable for a load detection model for determining the load. Alternatively, the intake manifold pressure may be simulated over the entire intake manifold pressure range by use of a calculation model, whereby in the lower partial range of the intake manifold pressure (in which the intake manifold pressure is detected using a sensor device) the measured intake manifold pressure is sent to a control device, by means of which the modeled intake manifold pressure is matched to the measured intake manifold pressure.

According to one aspect of the present invention for supercharged engines, the sensor device is designed in such a way that the sensor device covers the entire intake manifold pressure range without an active supercharger device (thus, in this lower pressure range the intake manifold pressure is determined directly by measurement), whereas in the pressure range above the maximum intake manifold pressure without an active supercharger device the intake manifold pressure is determined up to the maximum intake manifold pressure with an active supercharger device by use of a model.

Other objects, advantages and novel features of the present invention will become apparent from the following detailed description of the invention when considered in conjunction with the accompanying drawings.

BRIEF DESCRIPTION OF THE DRAWINGS

One exemplary embodiment of the invention is illustrated in the drawings and described in greater detail below. The figures show the following.

DETAILED DESCRIPTION OF THE DRAWINGS

Figure 1:
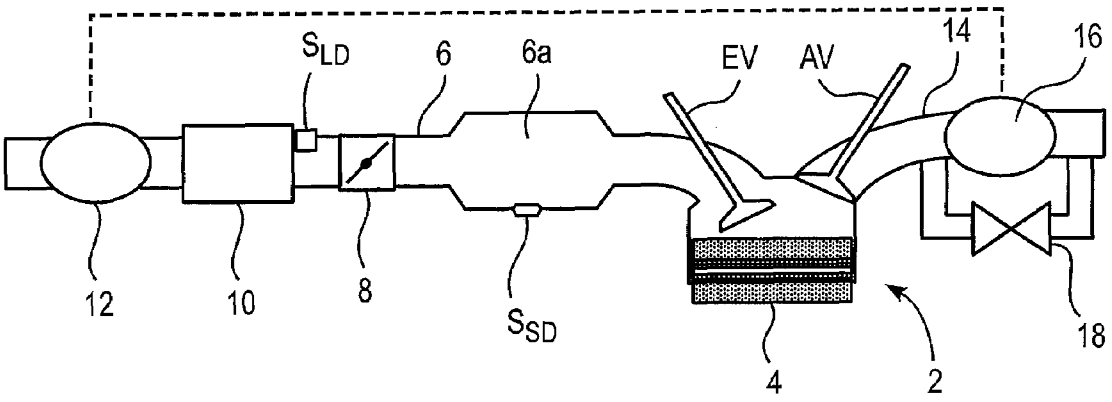
FIG. 1 is a schematic illustration of a cylinder of an internal combustion engine with the associated intake and exhaust ducts in accordance with exemplary embodiments of the present invention.
Figure 2:
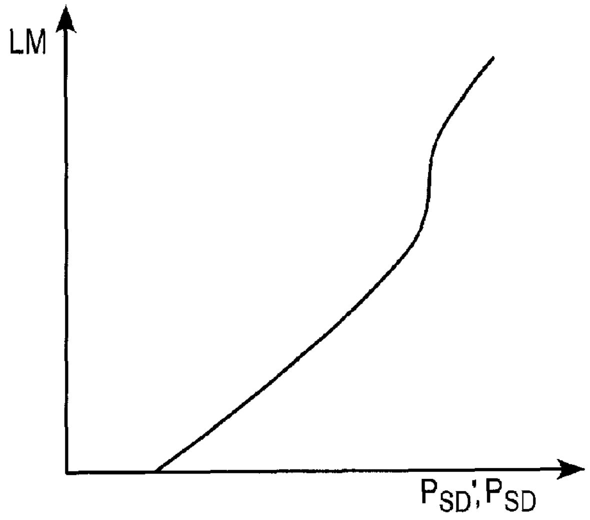
FIG. 2 schematically illustrates a plotted curve of the air mass supplied to the combustion chamber of a cylinder as a function of the intake manifold pressure in accordance with exemplary embodiments of the present invention.

FIG. 1 schematically illustrates a cylinder 2 of an internal combustion engine in a motor vehicle, in addition to the associated intake duct and exhaust duct thereof. A piston 4 driven by a crankshaft (not illustrated) moves up and down in the combustion chamber of the cylinder 2. The various cycles of an internal combustion process are carried out in cooperation with the valve drive, illustrated in a simplified manner by an intake valve EV and an exhaust valve AV, in addition to an associated valve control system which is preferably designed as a variable valve control system with regard to the valve control times and/or the valve strokes.

The intake duct includes an intake manifold 6 having a collector 6*a*, and provided in the collector 6*a* are a sensor device $S_{SD}$, designed as an intake manifold pressure sensor for measuring the intake manifold pressure $P_{SD}$, and a controllable throttle valve 8. In the illustrated embodiment having a supercharger device, also provided in the intake duct, upstream from the throttle valve 8 as viewed in the air flow direction, are a boost pressure sensor $S_{LD}$, an intercooler 10, and a compressor 12 for a supercharger device. In the illustrated portion of the exhaust duct, an exhaust manifold 14 having an integrated turbine 16 for the supercharger device and an associated controllable bypass 18 (wastegate) are shown.

To control the load, i.e., the air mass to be supplied based on the load requirement, it is necessary to know the quantity of the air mass actually remaining in the combustion chamber of the cylinder for the purpose of combustion. In some operating points the air mass flowing into the combustion chamber is not equal to the air mass remaining in the combustion chamber, since as the result of valve overlap, in particular in supercharger operation, so-called flooding may occur in which portions of the air mass supplied to the combustion chamber and still in the intake cycle are transported to the exhaust duct and are thus not available for the combustion process.

Figure 3:
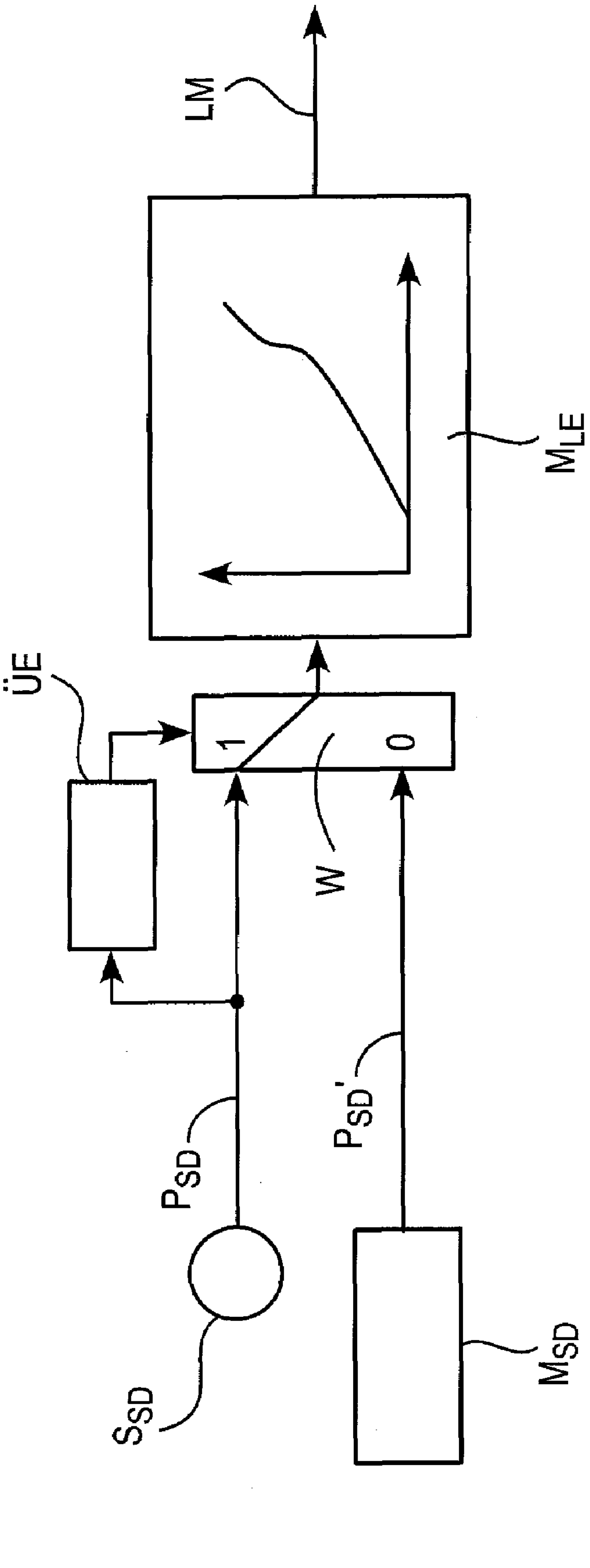
FIG. 3 is a schematic illustration of a device according to one exemplary embodiment of the present invention the invention.

FIG. 3 is a schematic illustration of a device according to one exemplary embodiment of the present invention the invention. The device according to the invention is designed so as to be capable of determining the inflowing air mass LM using a calculation model $M_{LE}$ for load detection, using the intake manifold pressure $P_{SD}$, $P_{SD}'$. A sensor device $S_{SD}$ for direct detection of the intake manifold pressure $P_{SD}$ is also present, and is designed (with respect to its measurement range) so as to be capable of measuring the intake manifold pressure $P_{SD}$ only in a lower partial range of the intake manifold pressure in the internal combustion engine. A calculation model $M_{SD}$ for indirect detection of the intake manifold pressure $P_{SD}'$ is also present, and is designed so as to be capable of determining by calculation the intake manifold pressure $P_{SD}'$ in an upper partial range of the intake manifold pressure in the internal combustion engine. The device is designed in such a way that within the lower partial range of the intake manifold pressure the inflowing air mass LM is determined as a function of the intake manifold pressure $P_{SD}$ measured by the sensor device $S_{SD}$, and that within the upper partial range of the intake manifold pressure the inflowing air mass LM is determined using the intake manifold pressure $P_{SD}'$ determined by use of the calculation model $M_{SD}$. For this purpose a monitoring device ÜE is provided which monitors whether the actual intake manifold pressure is present within the measurement range of the sensor device $S_{SD}$. If an intake manifold pressure is present which lies within the measurement range ($P_{sensor\_min}<x<P_{sensor\_max}$) of the sensor device $S_{SD}$, the measured intake manifold pressure $P_{SD}$ is sent to the calculation model $M_{LE}$ for load detection for further processing. If an intake manifold pressure is present which lies outside the measurement range ($x>P_{sensor\_max}$) of the sensor device $S_{SD}$, an intake manifold pressure $P_{SD}'$ is calculated, and is sent to the calculation model $M_{LE}$ for load detection (or for determining the air mass LM) for further processing instead of the measured intake manifold pressure $P_{SD}$. The choice as to which intake manifold pressure (measured intake manifold pressure $P_{SD}$ or model-based calculated intake manifold pressure $P_{SD}'$) is relevant and is to be sent is made by a switching element W actuated by the monitoring device ÜE.

Figure 4:
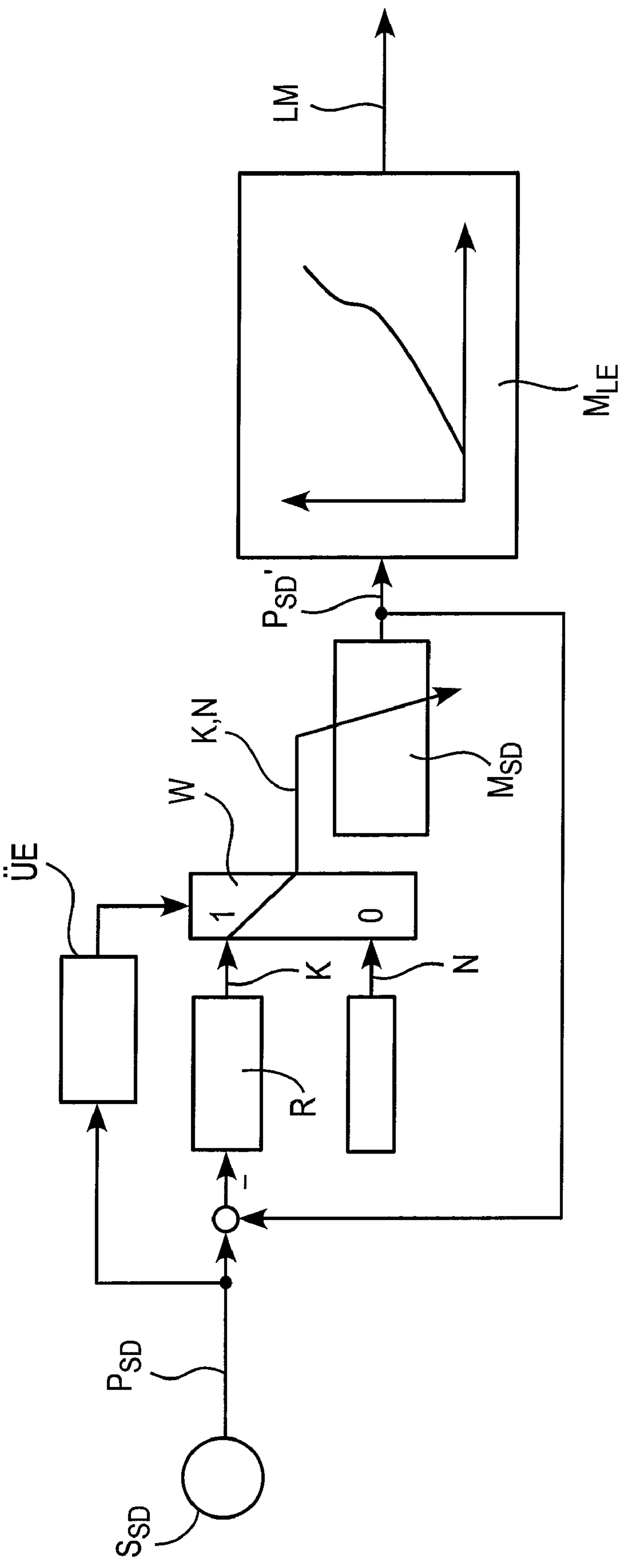
FIG. 4 is a schematic illustration of a device according to another exemplary embodiment of the present invention the invention.

As an alternative to the design according to FIG. 3, the device according to the invention for determining the load may be designed in such a way that it constantly operates with a model-determined intake manifold pressure $P_{SD}'$ as an input signal for the calculation model $M_{LE}$ for load detection. A device according to FIG. 4, for example, is used for this purpose. According to FIG. 4, the intake manifold pressure $P_{SD}'$ is always determined based on a model, and, depending on whether or not the intake manifold pressure is within the measurement range of the sensor device $S_{SD}$, by means of a correction value K the calculated intake manifold pressure $P_{SD}'$ is matched to the measured intake manifold pressure $P_{SD}$, or the calculated intake manifold pressure $P_{SD}'$ remains unchanged. For the case that the intake manifold pressure is within the measurement range of the sensor device $S_{SD}$, by means of a matching controller R a correction value K is determined for calculating the intake manifold pressure $P_{SD}'$. For this purpose, a difference between the measured intake manifold pressure $P_{SD}$ and the calculated intake manifold pressure $P_{SD}'$, supplied to the matching controller R, determines the correction value K, which is used to match the calculated intake manifold pressure $P_{SD}'$ to the measured intake manifold pressure $P_{SD}$. If the intake manifold pressure value is outside the measurement range of the sensor, the calculation model $M_{SD}$ for calculating the intake manifold pressure $P_{SD}'$ cannot be matched to the measured intake manifold pressure $P_{SD}$. The unmatched, calculated intake manifold pressure value $P_{SD}'$ is then used directly as an input variable for the subordinate calculation model $M_{LE}$ for load detection. For this purpose, a neutral value N, which does not influence the calculation of the intake manifold pressure, is sent to the calculation model for load detection instead of the correction value K.

Calculation models $M_{SD}$ and $M_{LE}$ can be embodied in logic and/or can be stored on a computer-readable medium which is loaded into and executed by a processor.

Figure 5:
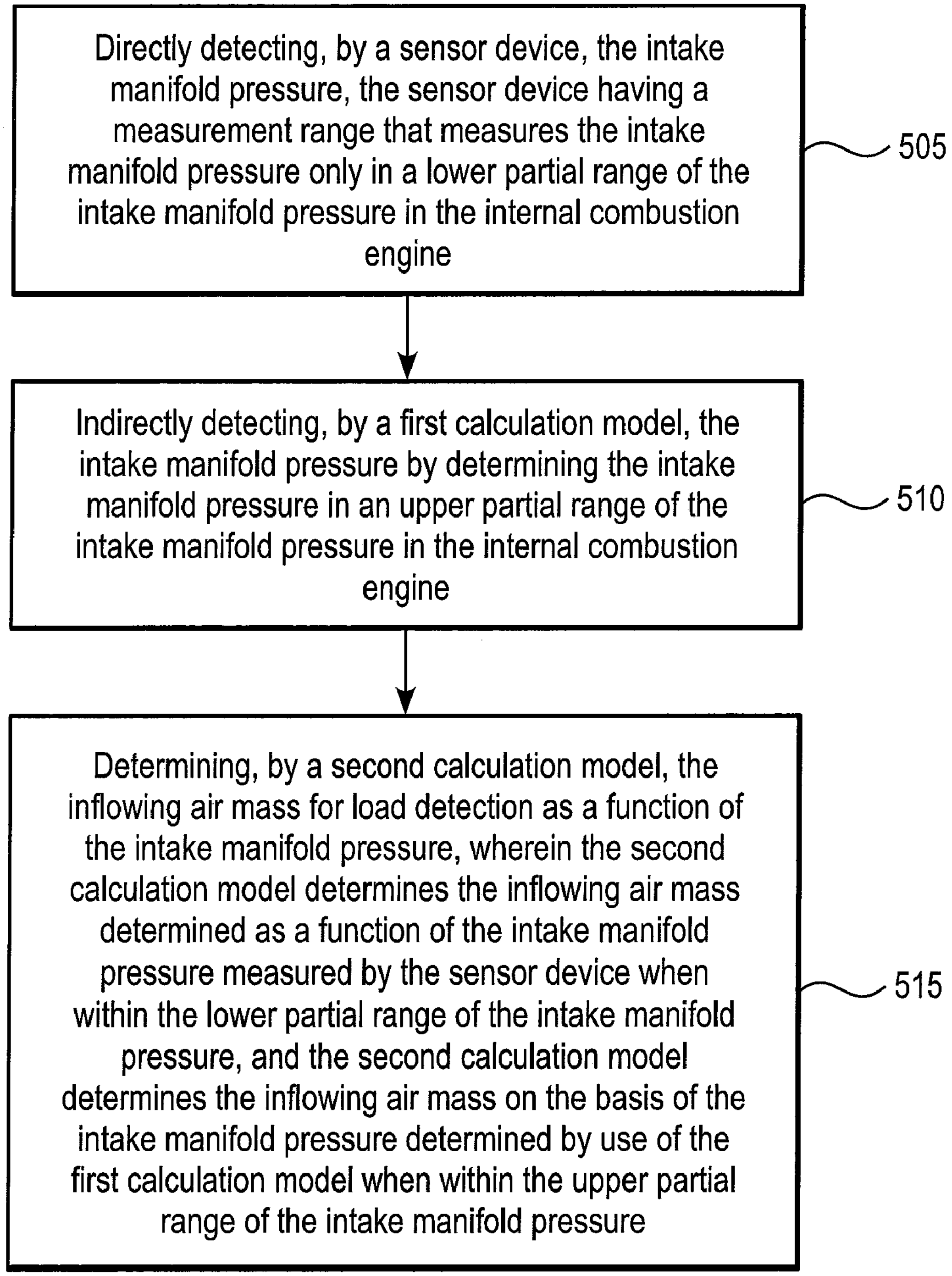
FIG. 5 is a block diagram of an exemplary method in accordance with the present invention.

FIG. 5 is a block diagram of an exemplary method in accordance with the present invention. A sensor device $S_{SD}$ directly detects the intake manifold pressure (step 505). Sensor device $S_{SD}$ has a measurement range that measures the intake manifold pressure only in a lower partial range of the intake manifold pressure in the internal combustion engine.

A first calculation model $M_{SD}$ indirectly detects the intake manifold pressure by determining the intake manifold pressure in an upper partial range of the intake manifold pressure in the internal combustion engine (step 510).

A second calculation model $M_{LE}$ determines the inflowing air mass for load detection as a function of the intake manifold pressure (step 515). The second calculation model $M_{LE}$ determines the inflowing air mass determined as a function of the intake manifold pressure measured by the sensor device $S_{SD}$ when within the lower partial range of the intake manifold pressure, and the second calculation model $M_{LE}$ determines the inflowing air mass on the basis of the intake manifold pressure determined by use of the first calculation model $M_{SD}$ when within the upper partial range of the intake manifold pressure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for determining the air mass flowing into the cylinder combustion chamber of an internal combustion engine cylinder in a motor vehicle, the device comprising:

a sensor device that directly detects the intake manifold pressure, the sensor device having a measurement range that measures the intake manifold pressure only in a lower partial range of the intake manifold pressure in the internal combustion engine;

a first calculation model that indirectly detects the intake manifold pressure, the first calculation model determines the intake manifold pressure in an upper partial range of the intake manifold pressure in the internal combustion engine; and a second calculation model that determines the inflowing air mass for load detection as a function of the intake manifold pressure, wherein the second calculation model determines the inflowing air mass determined as a function of the intake manifold pressure measured by the sensor device when within the lower partial range of the intake manifold pressure, and the second calculation model determines the inflowing air mass on the basis of the intake manifold pressure determined by use of the first calculation model when within the upper partial range of the intake manifold pressure.

2. A device according to claim 1, wherein the intake manifold pressure is determined over the entire intake manifold pressure range using the first calculation model that determines the intake manifold pressure, and in the lower partial range of the intake manifold pressure the determined intake manifold pressure is matched to the measured intake manifold pressure.

3. A device according to claim 1, wherein the device is coupled to a supercharged internal combustion engine, the sensor device having a measurement range corresponding to the pressure range up to the maximum intake manifold pressure without an active supercharger device, and the intake manifold pressure in this pressure range is determined directly using the sensor device, and in the pressure range above the maximum intake manifold pressure without an active supercharger device the intake manifold pressure is determined up to the maximum intake manifold pressure with an active supercharger device by use of the first calculation model.

4. A device according to claim 3, wherein the intake manifold pressure is determined over the entire intake manifold pressure range using the first calculation model that determines the intake manifold pressure, and in the lower partial range of the intake manifold pressure the determined intake manifold pressure is matched to the measured intake manifold pressure.

5. A method for determining the air mass flowing into the cylinder combustion chamber of an internal combustion engine cylinder in a motor vehicle, the method comprising:

directly detecting, by a sensor device, the intake manifold pressure, the sensor device having a measurement range that measures the intake manifold pressure only in a lower partial range of the intake manifold pressure in the internal combustion engine;

indirectly detecting, by a first calculation model, the intake manifold pressure by determining the intake manifold pressure in an upper partial range of the intake manifold pressure in the internal combustion engine; and determining, by a second calculation model, the inflowing air mass for load detection as a function of the intake manifold pressure, wherein the second calculation model determines the inflowing air mass determined as a function of the intake manifold pressure measured by the sensor device when within the lower partial range of the intake manifold pressure, and the second calculation model determines the inflowing air mass on the basis of the intake manifold pressure determined by use of the first calculation model when within the upper partial range of the intake manifold pressure.

* * * * *